Jan. 21, 1930.  P. H. GRANGER  1,744,698
MEANS FOR LOCATING, TESTING, AND CLEANING
LEAKS OR HOLES IN WELL CASINGS
Filed July 5, 1928
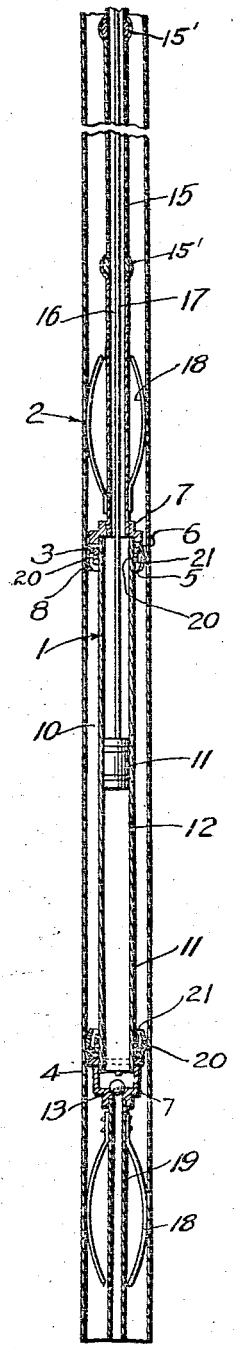
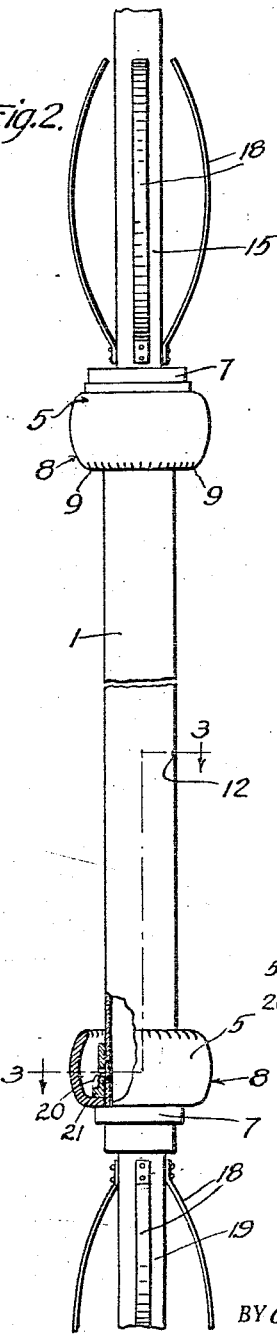
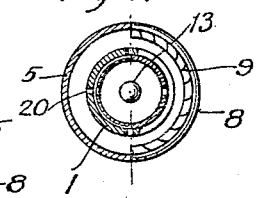
INVENTOR.
Paul H. Granger,
BY Arthur P. Knight &
Alfred W. Knight
ATTORNEYS.

Patented Jan. 21, 1930

1,744,698

UNITED STATES PATENT OFFICE

PAUL H. GRANGER, OF LOS ANGELES, CALIFORNIA

MEANS FOR LOCATING, TESTING, AND CLEANING LEAKS OR HOLES IN WELL CASINGS

Application filed July 5, 1928. Serial No. 290,443.

This invention relates to means for locating, testing and cleaning leaks or perforations in well casings and the main object of the invention is to provide means for this purpose which can be used to successively locate a number of leaks or holes so as to explore a well casing throughout any given portion of its height for the purpose of locating leaks therein.

Another important object of the invention is to provide a means for this stated purpose which will enable the size of the leak or the total area leaking to be estimated.

The accompanying drawings illustrate an embodiment of my invention and referring thereto:

Fig. 1 is a vertical section of the leak locating means within a portion of a well casing.

Fig. 2 is a side elevation of the leak locating means.

Fig. 3 is a section on line 3—3 in Fig. 2.

My improved leak locating means comprises a tubular member or cylinder 1 of metal which is adapted to be inserted within a well casing indicated at 2 in Fig. 1 and is provided with upper and lower packing means or packing rings 3 and 4 adapted to make a liquid tight joint or sliding connection with the walls of the casing 2. Each of said packing means may comprise a cup 5 of leather or other suitable yielding material having its central portion 6 clamped by a head 7 and nut 21 or otherwise to the tubular member 1 and having its peripheral portion 8 rounded and incurved at the free end so as to permit the cup to slide past slight obstructions on the wall of the tubing, said free end of said packing cup is preferably provided with reenforcements or protective device, such as wire lacing 9, which serves a double purpose of constricting or incurving such free end of the cup as above stated and of providing a metal member projecting sufficiently beyond the leather or flexible material of the cup to take the wear incident to passage of the packing means within the casing particularly when such packing means is passing joints or couplings between casing sections. The cup of the upper packing means 4 opens downwardly and the cup of the lower packing means 3 opens upwardly so that pressure of the liquid in the space 10 between said packing means and between the tubular member 1 and the casing 2 will tend to force the cups 5 outwardly against the wall of the casing 2 to form a tight joint, the tightness of the joint increasing with the pressure so that leakage of liquid past the packing means under such pressure is prevented. If desired, the parts 7 and 21 which secure the packing rings to cylinder 1, may be made of wood or other material weaker than the metal body of the cylinder, so that if the packing means stick or bind in the casing the cylinder may be drawn from the well, leaving the packing rings in the casing.

Means are provided for applying pressure to the liquid in the space 10 aforesaid, said means consisting for example of a plunger or piston 11 mounted to slide within the cylinder 1 and adapted to make a light tight joint with the walls of said cylinder, a perforation 12 being provided in the wall of cylinder 1 to permit fluid to flow from the interior of the cylinder to the space 10.

An operating tube or pipe 15 is connected to the upper end of the cylinder 1, said tube or pipe being made in any desired number of sections so as to permit the cylinder 1 to be lowered to any desired position in the well and an operating means for the piston 11 is provided consisting of a rod 17 also made in a plurality of sections it being understood that as the cylinder 1 is lowered into the well additional sections of the pipe 15 and rod 17 will be added on from time to time and in lifting or withdrawing the cylinder 1 such sections of the pipe and rod will be uncoupled progressively as these parts are drawn up. An opening 16 may be provided, for example, in the lowermost section of pipe 15 to permit passage of liquid into said pipe and into the cylinder 1.

A check valve, such as a ball valve 13 may be provided at the bottom of cylinder 1, said valve opening upwardly to permit inflow of liquid into the cylinder when the cylinder is being lowered. In case the check valve 13 is provided the opening 16 may be omitted if desired.

Guide means are preferably provided for the cylinder, said guide means consisting for example of springs 18 attached to the supporting tube 15 and to the downwardly extending tube 19 secured to the lower end of cylinder 1, said springs being in the form of bow springs of resilient metal adapted to engage the walls of the casing so as to guide the device as it is being lowered or raised in the casing. Openings 20 are preferably provided in the cylinder 1 and in the fitting 21 which secure the packing rings 5 to said cylinder to permit liquid to be forced into the interior of the rings or cups 5 from the cylinder so as to clean out any sediment that may collect in such rings or cups, particularly in the lower ring or cup.

Supporting pipe 15 is preferably provided with universal joints, indicated at 15' to ensure that the cylinder 1 will properly fit and ride in the casing, even when the casing deviates considerably from the vertical direction.

In order to locate a leak or leaks in a well casing by means of the present invention the device above described is lowered into the well casing by means of the suspending pipe 16 which is extended as above described by adding sections as it is lowered, sections also being added to the operating rod 17 at the same time. While the cylinder 1 may be of any desired length, I prefer to make it of considerable vertical extension, for example, abount one hundred (100) feet so as to enable a considerable vertical portion of the casing to be tested at each operation when the device has been lowered to a suitable depth which is assumed to be below the liquid level in the well, such liquid level being either naturally or artificially produced. The piston 11 is operated by first raising the rod 17 so as to raise the piston above the opening 12 thus permitting liquid to flow through into the cylinder 1 below the piston 11, it being understood that in this operation liquid will flow past one or the other of the packing rings 3 and 4 provided there is not sufficient inflow through a leak in the casing between these packing rings to supply the amount of liquid drawn into the cylinder 1 by the upward movement of the piston 11, the construction of the packing rings permitting passage of liquid from either above or below the cylinder to the space 10, but preventing passage in the opposite direction. The rod 17 is then pressed down causing the piston 11 to force liquid out through the opening 12 into the space 10. If there is no leak in the casing between the packing rings 3 and 4, this operation will immediately develop pressure on the piston and the operator will be advised by the resulting resistance of the downward movement of the rod 17 that this portion of the casing is substantially free from leakage. If, however, there is a leak in the portion of the casing between the packing rings 3 and 4 the downward movement of the piston will force the liquid through such leak and the fact that the rod 17 can be given a downward movement serves to advise the operator that a leak is present and he can estimate roughly the size or seriousness of the leak by the comparative ease with which the rod 17 can be forced down.

When a given portion of the well casing has been tested in this manner the device may be moved either upwardly or downwardly to another position and another portion of the casing tested in similar manner and in this manner the well casing may be explored for leaks throughout any desired portion of its height in minimum time and relatively small expense.

If desired the length or vertical dimension of a leak can also be determined by first lowering the cylinder until the diminished pressure on the rod 17 indicates the presence of a leak, then gradually raising the cylinder until application or pressure to the rod 17 is fully resisted, showing that the lower packing means has just passed the top of the leak, and marking the position of some point on the supporting pipe 15 with relation to any suitably fixed marker at the top of the well casing, then gradually lowering the cylinder by means of the supporting means 15 until pressure on the rod 17 again shows full resistance, indicating that the upper packing means has passed just beyond the lower end of the leak, and again marking the position of said point on the supporting means 15 with relation to the aforesaid fixed marker. The distance between the two marks so made, less the distance between the top of the lower packing ring and the bottom of the upper packing ring, will be substantially equal to the length of the leak.

The operation of the supporting tube 15 and the rod 17 in the manner above described may be effected by any suitable means, for example, by elevators or block and tackle in the same manner as is employed for the raising and lowering of well tubing, it being understood that the weight of the rod 17 extending from the top of the well to a point of leakage at least several hundred feet below the top of the well, will generally be sufficient to force the piston 11 downwardly to effect the testing operation and the upper end of the rod being supported by the block and tackle. The resistance to the downward motion of the piston by the pressure of the liquid within the cylinder below the piston can be estimated by the pull on the operating rope or cable of the block and tackle, or if desired, the rod 17 may be hung from the block and tackle by a spring scale, to measure the downward pull on the rod.

The device above described can also be used to determine whether perforations have been effectively formed in a well casing by the operation of a casing perforator. In some cases it has been found that a casing perforator fails to effectively perforate the casing by reason of oversize or of yielding of the casing at the part where it is attempted to perforate, and it is, therefore, desirable to be able to ascertain whether the perforations have been effectively made in the casing by a perforating means. To test the casing for this purpose, the device above described is lowered into the casing until the perforated level is reached and the portion of the casing which is assumed to have been perforated is then explored in the manner above described so as to determine whether and to what extent perforations have been formed in the casing. If desired, by making the device sufficiently short with the upper and lower packing rings with a few inches of one another the exploration of "perforated" section of the well casing may be carried out in such manner that exact level at which perforations where made or failed to be made can be determined.

The device can also be used for the purpose of washing out perforations in case they have become clogged, the device being lowered to the perforated section and liquid being forced from the cylinder 1 through the perforation 12 to the space 10 and cause this liquid to be forced outwardly through the perforation in the well casing to clean the same.

I claim:

1. Means for locating leaks in well casing comprising a cylinder having upper and lower packing means adapted to make a liquid tight joint with the wall of a well casing, said cylinder having a perforation intermediate said packing means, a supporting tube connected to said cylinder and adapted to extend upwardly through the well casing to the top of the casing, a piston working in said cylinder so as to apply pressure to liquid therein to force such liquid through the perforation in the cylinder into the space between the cylinder, the casing and the upper and lower packing means, and an operating rod connected to said piston and extending through said supporting tubes to the top of the well casing.

2. A device for locating leaks in well casing comprising a cylinder having upper and lower packing means extending around the cylinder and adapted to make fluid tight contact with the walls of the casing, said cylinder being provided with a perforation in its wall intermediate such packing means so as to establish communication between the interior of the cylinder and the space between the cylinder and the well casing, a piston mounted to operate in said cylinder, means connected to the cylinder and extending upwardly therefrom to support the cylinder, and means connected to the piston and extending upwardly therefrom to operate the piston within the cylinder.

3. A construction as set forth in claim 2, and comprising in addition a check valve at the lower end of the cylinder adapted to open upwardly.

In testimony whereof I have hereunto subscribed my name this 27th day of June 1928.

PAUL H. GRANGER.